Nov. 9, 1971  H. A. ECHOLS  3,618,392
LIQUID HANDLING APPARATUS
Filed Feb. 12, 1968  3 Sheets-Sheet 1
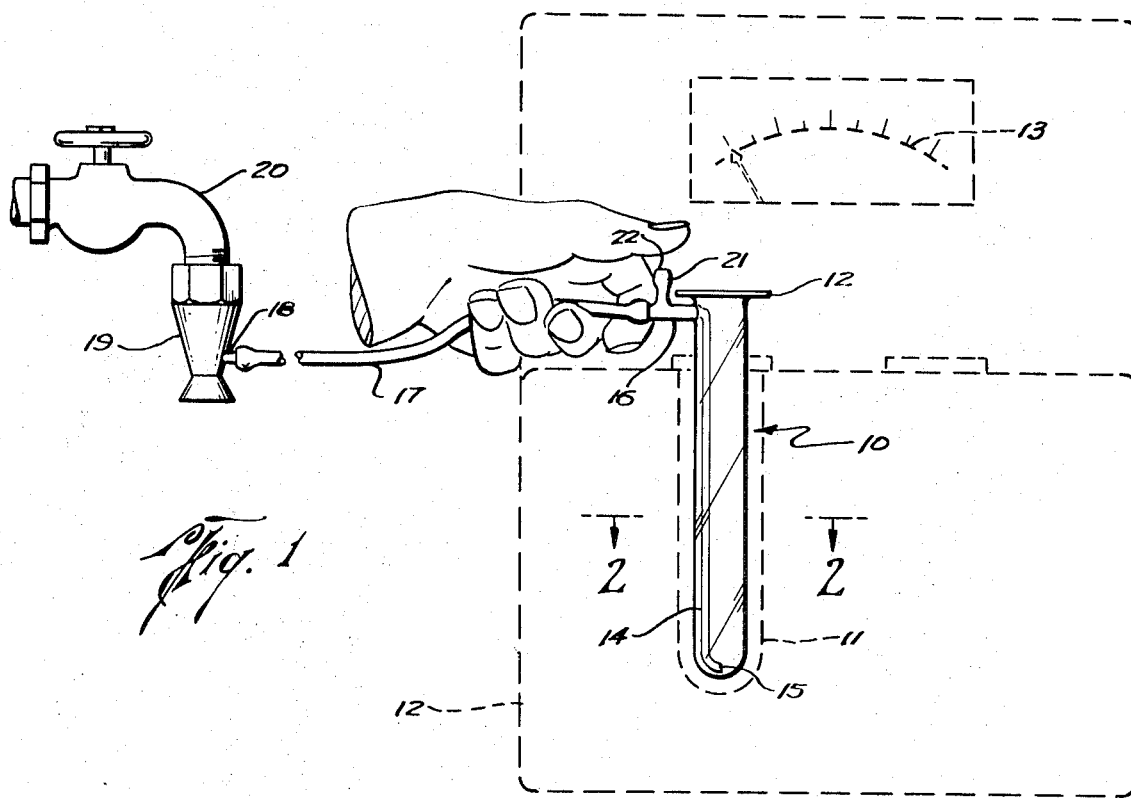
Fig. 1
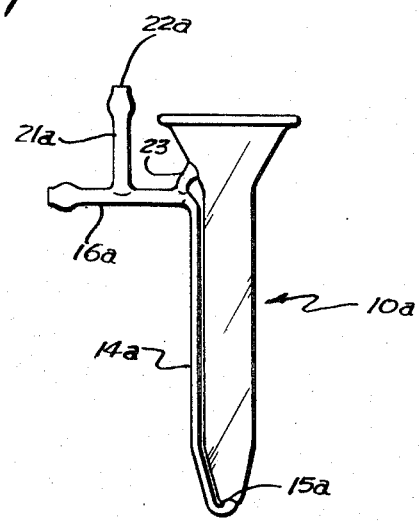
Fig. 3
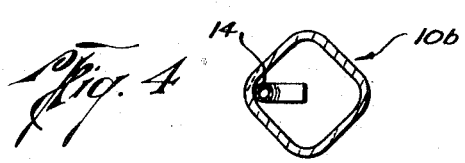
Fig. 2
Fig. 4
Harry A. Echols
INVENTOR.
BY Browning, Simms, Ager & Eickenroht
ATTORNEYS

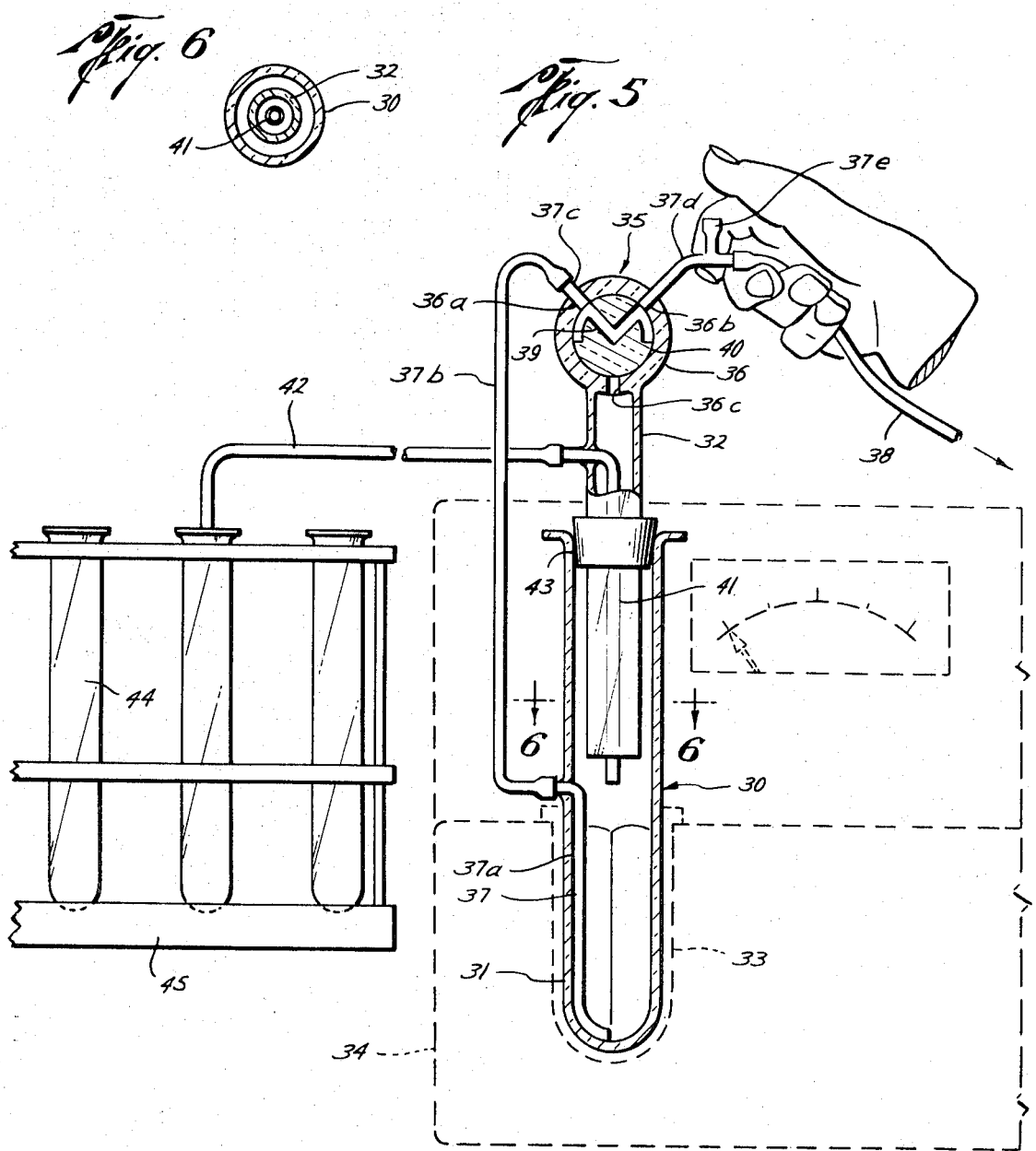

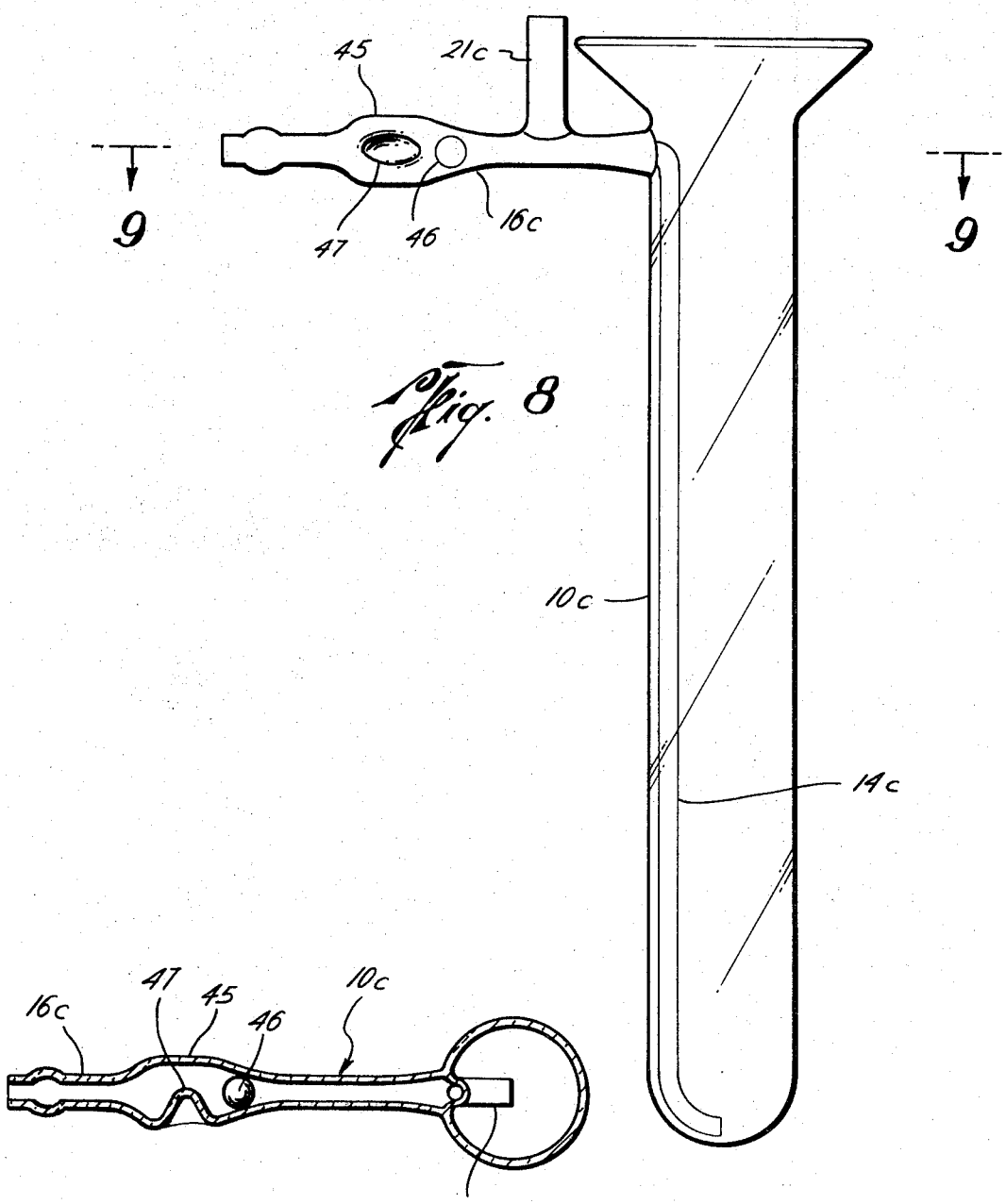

United States Patent Office 3,618,392
Patented Nov. 9, 1971

3,618,392
LIQUID HANDLING APPARATUS
Harry A. Echols, 2410 Wordsworth,
Houston, Tex. 77025
Continuation-in-part of application Ser. No. 574,879, Aug. 11, 1966, which is a continuation-in-part of application Ser. No. 483,564, Aug. 30, 1965. This application Feb. 12, 1968, Ser. No. 706,751
Int. Cl. G01n 1/10
U.S. Cl. 73—421 R                2 Claims

ABSTRACT OF THE DISCLOSURE

A self-evacuating cuvette having a small tube extending longitudinally along one side thereof between an opening in its lower end adjacent the bottom of the cuvette and level above the viewing area of the cuvette. At the upper level, the small tube extends laterally to a second opening in its other end outside of the cuvette. A tubular portion of the small tube connects at one end with its lateral extent thereof to provide a third opening in its other end. When the second opening is connected with a source of suction, and third opening is closed, as by a person's thumb, liquid may be suctioned out of the cuvette. In one modification of the cuvette, there is a check valve in the lateral extent between the second opening therein and the intersection therewith of the tubular portion to prevent back flow into the cuvette. In another modification of the cuvette, a means is provided for automatically pouring a sample into the cuvette.

---

This application is a continuation-in-part of my copending application, Ser. No. 574,879, filed Aug. 11, 1966, now abandoned which in turn was a continuation-in-part of my copending application, Ser. No. 483,564, filed Aug. 30, 1965, and now abandoned.

This invention relates generally to apparatus for handling liquid samples in various laboratory practices, such as in the measurement of their optical density by means of a spectrophotometer, colorimeter, or the like. More particularly, it relates to an improved high optical quality test tube, known as a "cuvette" or "cell," in which a liquid sample may be contained and then evacuated without removal from the spectrophotometer or other instrument.

In the measurement of the optical density of a liquid by means of such an instrument, a test tube of this type is mounted within a well within the instrument to dispose the liquid between a light source and a photocell within the instrument. This enables the laboratory technician to observe the transmission of the light source and thus determine the optical density of the sample liquid with respect to a standard liquid, such as water.

In work of this type, it is usually necessary to observe many different types of liquid in a relatively short time. For this purpose, the technician may use a number of different cuvettes or cells, one for each liquid to be measured, in an effort to prevent contamination of the liquids and also to avoid the time consuming chore of emptying a test tube between each sample. However, this practice has not been entirely satisfactory because each test tube, despite its high quality, may be optically different from the other.

Consequently, it is the usual practice to use the same test tube for the different samples, and thus to fill it with one liquid just as soon as the other liquid has been poured from it. Ordinarily, of course, this requires that the technician take the time to wash the test tube between different liquids. Also, of course, handling of the single test tube will leave fingerprints on the outside which will interfere with the spectroanalysis. Still further, caution must be taken to place the tube back into the well in the circumferential position each time it is used, because the optical characteristics about its circumference will differ.

Apparatus has therefore been proposed for handling these liquid samples without removing the test tube from the well. This so-called "self-evacuating" system includes a test tube having a smaller tube extending longitudinally along one side thereof from an opening in its lower end connecting with the bottom of the test tube to a position near the upper end of the test tube and then laterally thereof through the side of the test tube. The end of the lateral extent of the smaller tube is also open and connected by means of tubing to a vacuum pump. A stopcock as well as a waste catcher is connected in the tubing, with the waste catcher intermediate the stopcock and pump. Thus, after a liquid has been analyzed within the test tube, the technician may open the stopcock so that the vacuum pump draws the liquid sample out of the test tube and into the waste catcher. Upon evacuation of the test tube, the technician then closes the stopcock and fills it with the next sample.

Even with a "self-evacuating" system, it is necessary to manually pour each liquid sample into the test tube. Such a practice is not only time consuming, but also extremely awkward when there is limited head room above the well in which the test tube is received. Also, of course, it requires that the top of the test tube be open at least part of the time, so that the liquid sample cannot be kept in a vapor-proof environment.

Furthermore, in the event there is unexpected back pressure in the tubing, which could occur, for example, in the event the vacuum pump becomes clogged, there could be back flow into the test tube. This in turn could cause liquid to spill over from the tube onto the instrument in which the tube is carried.

An object of this invention is to provide a greatly simplified self-evacuating system for this and other purposes, and, more particularly, to provide novel liquid handling apparatus for making this possible.

Another object is to provide such a liquid handling apparatus which is of simplified and inexpensive construction.

A further object is to provide such liquid handling apparatus which also avoids the necessity of manually pouring the sample into the test tube, in that it enables the sample to be automatically suctioned into the test tube in essentially the same manner that it is evacuated therefrom; and, more particularly, in which the sample may be maintained in a vapor proof environment during such automatic filling and discharging.

Still another object is to provide such liquid handling apparatus which prevents back flow into the test tube.

In the drawings, wherein like reference characters are used throughout to designate like parts:

FIG. 1 shows a system for evacuating liquid from a test tube constructed in accordance with the present invention and mounted within the well of a spectrophotometer;

FIG. 2 is a cross-section view of the test tube shown in FIG. 1, as seen along broken line 2—2 thereof;

FIG. 3 is an elevational view of a modified form of a test tube constructed in accordance with the present invention;

FIG. 4 is a cross-sectional view of another modified form of test tube built in accordance with this invention;

FIG. 5 shows modified apparatus for automatically filling as well as evacuating a test tube constructed in accordance with another embodiment of this invention, and, as in the case of the test tube of FIG. 1, mounted within the well of a spectrophotometer, such apparatus including a valve shown in cross-section and positioned for evacuating the tube;

FIG. 6 is a cross-sectonal view of the test tube of FIG. 5 as seen along broken lines 6—6 of FIG. 5;

FIG. 7 is a view of the valve shown in FIG. 5, but positioned for filling the tube;

FIG. 8 is an elevational view of another modified form of a test tube having means to prevent back flow into it; and FIG. 9 is a horizontal sectional view of the test tube of FIG. 8, as seen along broken line 9—9 thereof.

With reference particularly to the system shown in FIG. 1, the test tube 10 is mounted within a well 11 extending vertically downwardly from the top side of a spectrophotometer 12, indicated diagrammatically by broken lines. The test tube is of generally conventional construction in that it has a closed lower end and an open upper end surrounded by a lip 12. When mounted in the position shown, it is adapted to receive a liquid sample whose optical density is to be determined. For this reason, and as previously noted, the well 11 positions the tube and thus the liquid contained therein between a light source and photocell within the instrument which measures the transmission of the light source through the liquid and records it upon a scale 13. As will be noted from FIG. 1, a greater majority of the length of the tube 10 beneatth the neck about its upper end extends within the well 11 so that the tube has a maximum of available area in which the liquid sample may be viewed.

As also noted above, the test tube is ususual and particularly adapted for this usage in that it has high quality optical characteristics. Such test tubes are known as cuvettes when they are round in cross section, as in the case of test tube 10 of FIGS. 1 and 2 as well as the modified test tube 10a shown in FIG. 3, and known as "cells" when polygonal in cross section, as shown by the test tube 10b of FIG. 4. In any event, it will be understood that the novel test tube of the present invention may have uses in other environments which do not require such high quality optical characteristics.

As also shown in FIGS. 1 and 2, a smaller tube 14 of the same material as the test tube extends longitudinally within the test tube between its lower end 15 which opens to the bottom of the test tube to a position near the top of the tets tube and then extends laterally through the side of the test tube. Thus, the tube is made up in two integrally connected sections—namely, an inner section whose upper end is fused to an opening through the side of the test tube and an outer section whose inner end is also fused to the opening to form a smooth continuation of the inner section. The end of the lateral extent 16 of the smaller tube 14 is also open to provide an unobstructed flow path within it between the bottom of the test tube and the exterior thereof. More particularly, the longitudinal extent of the inner tube is disposed to one side of the test tube so as not to interfere with the transmission of the light source through the liquid contained in the test tube.

As will be noted, since the lateral extent 16 of the smaller tube is near the top of the tube, it too is above the viewing area of the test tube 10. Thus, the liquid sample need not be poured into the test tube above level of lateral extent 16.

The outside diameter of the inner section of the smaller tube 14 is as small as possible so as to obstruct as little of the clear portion of the test tube as possible. However, its inner diameter or flowway may not be much less than 2 millimeters, because otherwise it may cause capillary action. However, this requires an outside diameter of only 4 millimeters, which is still quite small in comparison to even the smallest test tubes of this type, which are not less than 10 millimeters in outside diameter.

One end of a flexible tubing 17 is slipped over the open end of the lateral extent 16 of the smaller tube, and the other end of the tubing is slipped over a side inlet 18 to an aspirator 19 or the like releasably connected to a conventional water faucet 20 found in laboratories and other environments. The aspirator 19 may also be of any conventional construction adapted for creating a suction through the side inlet 18, so that, with the faucet turned on, it will tend to draw liquid contained within the test tube 10 up through the smaller tube 14.

However, the smaller tube 14 also has an upstanding tubular portion 21 which connects an intermediate portion of its lateral extent 16 within its open upper end 22 for normally venting such tube to the atmosphere. If the internal diameter of the portion 21 is larger than the internal diameter or flowway of the inner or longitudinally extending section of the smaller tube, the suction from the aspirator is not effective to draw the liquid up through the smaller tube as long as this vent is open. I have found with an inner section of the smaller tube having an inside diameter of about 2 millimeters, that of the lateral extent 16 and portion 21 may be about 4 millimeters. However, in no event should the inside diameter of portion 21 be substantially larger than that of the smaller tube, because this will cause the liquid to be greatly agitated within such portion.

In order to render the suction effective to evacuate a sample liquid, the technician merely closes the upper end 22 of portion 21, of the smaller tube, as by means of his thumb which he presses over such open end while grasping tube 17, as shown in FIG. 1. I have found that the evacuation is not only fast, but also more complete than is possible by pouring the liquid from the test tube. Thus, with this system, it is possible to analyze samples in rapid order, because just as soon as one sample has been evacuated, the technician may raise his thumb and fill the tube with a subsequent sample with the other hand. During this time, of course, the technician may leave the faucet running with no loss of power other than the water which runs through the aspirator.

The system may include a waste catcher in the tubing intermediate the test tube and the aspirator in the event it is desired to retain the sample. Also, a check valve may be disposed within the tubing 17 just upstream of the aspirator 19, and in any vent intermediate the aspirator and the waste catcher in the event the latter is used. This will insure against any backflow from the aspirator into the waste catcher or test tube.

Inasmuch as the test tube is not removed from the well 11, it will ordinarily not rotate an appreciable amount within it. In addition to this, the tubing 17, although flexible, will ordinarily be without kinks or sharp bends so that its connection between the lateral extent 16 of the inner tube and the aspirator 19 will maintain the test tube in at least approximately the same circumferential position within the well.

In the cuvette 10a illustrated in FIG. 3, the smaller tube 14a extends longitudinally along the outside of the test tube with its lower end 15a bending upwardly to connect with the bottom of the test tube. In this form of the invention, the smaller tube does not pass through the test tube, but is merely bent near the upper end of the test tube so as to dispose the open outer end of its lateral extent 16a to one side thereof. Thus, the longitudinal and lateral extents of the smaller tube are not only integral, as in the cuvette 10, but also made of one piece. Without the support it would obtain from passing through the test tube, the smaller tube normally requires connection to an upper portion of the test tube, which may be a strut 23 as shown in FIG. 3. In addition, of course, some support is provided by the fusion of the lower end of the smaller tube to the opening in the bottom of test tube 10a with which it connects. The tube 14a may also be made in two sections—namely, the smaller longitudinal section which is fused at its upper end to the inner end of the larger lateral section.

In many respects, the test tube 10a is similar to that of test tube 10 in that the smaller tube has an upstanding portion 21a with an open end 22a connecting with an intermediate portion of the lateral extent 16a. As in the case of tube 10, the technician may use the tube 10a in the system shown in FIG. 1 by selectively covering the open upper end 22a with his thumb to evacuate the test tube when desired. However, an additional feature of the tube 10a is that the exterior disposal of the longitudinal extent of the smaller tube 14a provides a positive means for indexing the tube within the wells of certain spectrophotometers or similar instruments. That is, many of these wells have notches formed longitudinally thereof to receive an exterior tube or other indexing part on the outer side of the test tube.

The cell 10b shown in FIG. 4 is identical in construction to the cuvette 10 shown in FIGS. 1 and 2, except that it is square in cross section and has a flat bottom. Obviously, such a cell may also be constructed similarly to the cuvette shown in FIG. 3 in that the longitudinal extent of the smaller tube may be disposed exteriorly of the test tube.

The liquid handling apparatus forming a part of the system illustrated in FIG. 5 includes tubular means 30 made up of a test tube 31 and an open-ended tubular body 32 removably fitted in the open top of the test tube. The test tube 31 is similar to test tubes 10 and 10a previously described in that it is of generally conventional construction having a closed bottom and adapted to be mounted within a well 33 of a spectrophotometer 34 or like instrument, indicated diagrammatically by broken lines. Also, its optical characteristics and function in containing a liquid sample whose optical density is to be determined is similar to that of the previously described test tubes.

However, as previously mentioned, this embodiment of the invention is adapted not only to automatically evacuate the test tube, but also to automatically fill it—i.e., without the necessity of manually pouring each sample into the test tube. This added function is made possible not only by the addition of the tubular body 32 but also valve means 35 including a valve housing 36 closing the upper end of the tubular body 32, together with certain modifications of the test tube 31 and various parts associated with the test tube 31, tubular body 32, and valve means 35, all to be described to follow.

The test tube 31 is modified in that the smaller suction tube 37 thereof is made up of several separately connected sections, including a section 37a extending longitudinally of the test tube from an opening in its lower end connecting with the bottom of the test tube to an intermediate level of the test tube, where it is fused to an opening through such intermediate level. A short lateral extent of the tube section 37a is also fused to the outside of the opening through the test tube 31 to form a smooth continuation of the longitudinal extent for releasable connection with a flexible tube section 37b whose lower end may be slipped over the short lateral extent. The upper end of flexible tube section 37b is in turn slipped over a short tube section 37c which connects with a port 36a through the valve casing 36 to provide an inlet thereto.

A still further tube section 37d is connected to and extends outwardly from a port 36b in the valve casing 36 to provide an outlet therefrom. The inlet and outlet are connected by passageway 39 through rotatable valve member 40 which in the position of FIG. 5 provides a portion of the smaller tube 37. A portion 37e connects with an intermediate portion of the tube section 37d and has an opening in its upper end to vent the overall tube 37 intermediate its opposite ends. More particularly, a flexible tube 38 is slipped over the outer end of tube section 37d for connection with an aspirator on a faucet, or other suitable means for creating a suction through the flexible tube 38.

As in the case of the previously described embodiment, the inside diameter of the portion 37e and tube section 37d bears the proper relationship to the inside diameter of tube sections 37a and 37b, so that normally this vent opening will prevent the liquid sample from being suctioned from the test tube 31. However, when the opening through the upper end of portion 37e is closed, as by means of the technician's thumb, the aspirator will suction the liquid sample through the smaller tube 37, similarly to the manner in which the liquid sample is suctioned from the test tubes 10 and 10a.

The tubular body 32 also has a smaller tube 41 extending longitudinally therein from its open lower end which projects beneath the lower end of tubular body 32 and then laterally through the side of body for releasable connection with a flexible tube 42. As in the case of the smaller tube section 37a, the smaller tube 41 may be made up of longitudinal and lateral extents fused at their upper and inner ends, respectively, to an opening through the tubular body 32.

A ground glass collar 43 about the tubular body 32 fits tightly within the open top of the test tube 31 for closing it in a vapor-tight manner. There is also a port 36c through the valve casing which connects at its lower end with the inside of the tubular body 32 about the smaller tube 41. Thus, with reference to FIG. 7, the valve member 40 may be rotated so as to move the passageway 39 into a position in which it connects the port 36c with the port 36b providing the outlet from the valve casing. In this manner, the vent opening in the upper end of portion 37e may be closed to create a suction within the tubular body 32 and thus within the lower end of the smaller tube 41. This, of course, enables the liquid sample to be suctioned up through the flexible tubing 42 and into the test tube 31. At the same time, since the passageway 39 is disconnected from port 36a, it closes the suction tube 37 to prevent evacuation of the sample.

As shown in FIG. 5, the outer end of flexible tubing 42 may be selectively disposed within one of a series of test tubes 44 mounted upright within a rack 45 adjacent the spectrophotometer 34. With this automatic means for fillling the test tube, a liquid sample may be selectively taken from each of the test tubes without need for manually handling any one of them. Furthermore, once drawn into the test tube, the sample is contained in vapor-proof fashion. After the sample has been suctioned into the test tube, and the reading on the spectrophotometer has been taken, the valve body may be moved from the position in FIG. 7 back to the position of FIG. 5, so that the sample may be evacuated from the test tube by again closing the vent opening from the upper end of portion 37e.

The cuvette 10c shown in FIGS. 8 and 9 is very similar in construction to the cuvette 10 shown and described in connection with FIGS. 1 and 2, except that it includes a check valve incorporated into the lateral extent 16c of the smaller tube 14c for preventing blackflow into the cuvette. Thus, as can be seen from FIGS. 8 and 9, this lateral extent is somewhat longer than that of the cuvette 10 and has an enlargement 45 located between the second opening in the smaller tube and the intersection of the tubular portion 21c with the lateral extent. A ball check valve member 46, which is preferably made of finely ground glass, is laterally shiftable within the enlargement 45 between a position engaged against the end of the enlargement nearest the tubular portion 21c and another position away from such end and toward the outer end of the lateral extent. In the first of these positions, the ball check valve member seats against a smooth surface about the intersection of the inner diameter of the enlargement with the inner diameter of the portion of the lateral extent 16c leading to it so as to prevent backflow (left to right).

On the other hand, the inner diameter of the enlargement is somewhat larger than the outer diameter of the ball check valve member, so that when the ball check valve member moves away from the seat, liquid can be evacuated through the lateral extent 16c in the manner previously described in connection with cuvette 10. As can be seen from the drawings, in this position, the ball check valve member is prevented from engagement with the intersection of the left hand end of the inner diameter of the enlargement with the inner diameter of the outer end of the lateral extent 16c. For this purpose, a small dimple 47 is formed in the enlargement so as to protrude into the inner diameter of the enlargement and thereby engage the check valve member 46 as it shifts in a leftward direction.

This last described embodiment of the cuvette thereby further simplifies the self-evacuating system in that it eliminates the need for any separate check valve member in the downstream portion of tubing leading from the cuvette to the aspirator. More particularly, it accomplishes this purpose without unduly complicating either the construction of the cuvette itself, and particularly the portion thereof by which it may be manipulated in the handling of the liquid samples. That is, since the check valve is merely incorporated into an extension of the lateral extent of the smaller tube, it in no way inconveniences the operator, and in fact facilitates his use of this apparatus in that it provides him with a longer lateral extent for gripping in the manner illustrated in FIG. 1.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Liquid handling apparatus, comprising tubular means having a closed bottom and an open top, a first smaller tube extending upwardly from a first opening in one end connecting with the bottom of the tubular means to a second opening in its outer end outside of said tubular means, a second tmaller tube extending within the tubular means from a first opening in its lower end through the side of the tubular means to a second opening in its upper end, a valve casing closing the top of the tubular means, said valve casing having a first port connecting with the tubular means about the second smaller tube, a second port providing an inlet to the casing, and a valve member movable within the valve casing and including a passageway therethrough for selectively connecting the second port with the third port to form a portion of the first smaller tube so that liquid may be discharged therethrough from the tubular means, and the first port with the third port for drawing the liquid from the second smaller tube into the tubular means.

2. Liquid handling apparatus of the character set forth in claim 1, wherein the tubular means includes a test tube and an open-ended tubular body removably fittable in the open top of the test tube, said second smaller tube includes a section extending longitudinally within the tubular body and laterally therethrough, said valve casing closes the upper end of the tubular body, and said first smaller tube includes a first section fixed to and extending longitudinally of the test tube and a second section removably connected between the first section and the second port of the valve casing.

References Cited

UNITED STATES PATENTS

| | | | |
|---|---|---|---|
| 334,059 | 1/1886 | Tatum | 137—533.11 |
| 3,225,601 | 12/1965 | Shrewsbury | 88—14 X |
| 3,286,583 | 11/1966 | Ferrari. | |

FOREIGN PATENTS

| | | |
|---|---|---|
| 174,090 | 1/1961 | Sweden. |

S. CLEMENT SWISHER, Primary Examiner

U.S. Cl. X.R.

356—246